United States Patent
Suese

(10) Patent No.: US 9,094,555 B2
(45) Date of Patent: Jul. 28, 2015

(54) READING DEVICE, IMAGE FORMING APPARATUS INCLUDING THE SAME, AND CONTROL METHOD FOR READING DEVICE

(71) Applicant: KYOCERA Document Solutions Inc., Osaka (JP)

(72) Inventor: Narihiko Suese, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/487,717

(22) Filed: Sep. 16, 2014

(65) Prior Publication Data

US 2015/0085330 A1 Mar. 26, 2015

(30) Foreign Application Priority Data

Sep. 25, 2013 (JP) .................. 2013-198881

(51) Int. Cl.
H04N 1/04 (2006.01)
H04N 1/00 (2006.01)
H04N 1/10 (2006.01)

(52) U.S. Cl.
CPC ........ *H04N 1/00782* (2013.01); *H04N 1/00588* (2013.01); *H04N 1/00689* (2013.01); *H04N 1/00708* (2013.01); *H04N 1/00824* (2013.01); *H04N 1/1061* (2013.01); *H04N 2201/0081* (2013.01); *H04N 2201/0094* (2013.01); *H04N 2201/02497* (2013.01)

(58) Field of Classification Search
CPC ..................... B65H 2511/514; B65H 2220/09; B65H 2404/1422; B65H 2801/39; B65H 5/062; H04N 1/00572; H04N 1/00795; H04N 1/00602; H04N 1/00692; H04N 1/00811; H04N 1/00824
USPC .......... 358/474, 496, 497, 1.2, 488, 505, 409, 358/498; 399/364, 144, 17, 182, 183, 184, 399/19, 373, 408, 410, 83; 382/260, 274, 382/284, 298
See application file for complete search history.

(56) References Cited

U.S. PATENT DOCUMENTS

| | | | | |
|---|---|---|---|---|
| 6,535,706 B1 * | 3/2003 | Konno | ........................ | 399/182 |
| 7,199,907 B2 * | 4/2007 | Shimizu | ....................... | 358/448 |
| 8,228,552 B2 * | 7/2012 | Shirai | ........................... | 358/1.2 |
| 8,243,347 B2 * | 8/2012 | Okada | .......................... | 358/474 |
| 8,432,586 B2 * | 4/2013 | Hamano et al. | ............... | 358/505 |
| 8,537,440 B2 * | 9/2013 | Shimizu | ....................... | 358/505 |
| 8,553,296 B2 * | 10/2013 | Yamamoto | ................... | 358/474 |

(Continued)

FOREIGN PATENT DOCUMENTS

JP 2007-288585 A 11/2007

*Primary Examiner* — Negussie Worku
(74) *Attorney, Agent, or Firm* — Stein IP, LLC

(57) ABSTRACT

The reading device includes an image reading unit, a document feeder unit, a table document detection unit for detecting presence or absence of a document on the place-reading contact glass, a document set sensor for detecting setting of the document, a size detection unit for detecting a size of the document on the document tray, and an open/close detection unit for detecting open and close of the document feeder unit. In a determination necessary state in which setting of the document is not detected while an object on the document tray is detected, it is determined to execute feed reading, or to execute place reading, or to be disabled to confirm to execute the place reading or the feed reading, based on whether or not there is a document on the place-reading contact glass and based on history information.

11 Claims, 9 Drawing Sheets

(56) References Cited

U.S. PATENT DOCUMENTS

| | | | |
|---|---|---|---|
| 8,693,071 B2* | 4/2014 | Ito et al. | 358/498 |
| 8,797,608 B2* | 8/2014 | Seto | 358/474 |
| 8,908,222 B2* | 12/2014 | Nagata | 358/1.16 |
| 2005/0122547 A1* | 6/2005 | Yamanaka | 358/474 |
| 2006/0193013 A1* | 8/2006 | Hoshi | 358/474 |
| 2013/0063748 A1* | 3/2013 | Mimura | 358/1.13 |

* cited by examiner

FIG.7

| DETERMINATION | DOCUMENT TRAY | DETECTION OF DOCUMENT SIZE ON DOCUMENT TRAY | DOCUMENT ON TABLE | OPEN/CLOSE HISTORY | DOCUMENT READING DETERMINATION | EXPECTED SITUATIONS |
|---|---|---|---|---|---|---|
| (1) | DOCUMENT EXISTS | DETECTED | – | – | FEED READING | DOCUMENT IS SET ON DOCUMENT TRAY |
| (2) | NO DOCUMENT | NOT DETECTED | – | – | PLACE READING | NO DOCUMENT ON DOCUMENT TRAY |
| (3) | NO DOCUMENT | DETECTED | NO DOCUMENT | NOT OPENED AND CLOSED | FEED READING | DOCUMENT MAY BE SET ON DOCUMENT TRAY NO DOCUMENT ON TABLE FROM BEGINNING |
| (4) | NO DOCUMENT | DETECTED | NO DOCUMENT | OPENED AND CLOSED | FEED READING | DOCUMENT MAY BE SET ON DOCUMENT TRAY DOCUMENT ON TABLE IS REMOVED |
| (5) | NOT DETECTED | DETECTED | DOCUMENT EXISTS | OPENED AND CLOSED | PLACE READING | DOCUMENT MAY BE SET ON DOCUMENT TRAY DOCUMENT IS SET AGAIN ON TABLE |
| (6) | NOT DETECTED | DETECTED | DOCUMENT EXISTS | NOT OPENED AND CLOSED | DISABLED TO CONFIRM | DOCUMENT MAY BE SET ON DOCUMENT TRAY DOCUMENT IS LEFT ON TABLE |

READING DEVICE, IMAGE FORMING APPARATUS INCLUDING THE SAME, AND CONTROL METHOD FOR READING DEVICE

CROSS-REFERENCE TO RELATED APPLICATIONS

This application is based upon and claims the benefit of priority from the corresponding Japanese Patent Application No. 2013-198881, filed Sep. 25, 2013, the entire contents of which are incorporated herein by reference.

BACKGROUND OF THE INVENTION

Field of the Invention

The present disclosure relates to a reading device for reading document sheets transported by a document feeder unit or a document placed on a place-reading contact glass, and a control method for the reading device. In addition, the present disclosure relates to an image forming apparatus including the reading device.

The reading device may be equipped with a document table (contact glass). The document table is a plate-like glass on which a document to be read is placed. This reading device is provided with a cover for covering a top surface of the document table. After the cover is closed, the document is irradiated with light from below while the irradiation position is moved along a sub-scanning direction. Thus, one sheet of the document is read based on reflection light from the document. Further, reading of a document may be performed in a state where no document is placed on the document table (vacant scanning). However, the vacant scanning is wasteful reading. Therefore, there is known an image reading device that avoids the vacant scanning as follows.

Specifically, there is known an image reading device, which includes a document table on which a document is placed, and a document table cover. The image reading device accepts an instruction to start an image reading operation of a document placed on the document table, detects an open/close state of the document table cover, and measures an elapsed time after detecting that the document table cover is closed. When the start of the reading operation is instructed, the reading operation is performed in the case where the elapsed time is a predetermined time or shorter. In case where the elapsed time is longer than the predetermined time, the image reading device performs notification for urging to check whether or not to perform the reading operation.

In this way, the reading device may be equipped with the document table (place-reading contact glass). The reading device reads a document sheet placed on the place-reading contact glass so as to generate image data (hereinafter referred to as "place reading").

When reading a plurality of document sheets, it takes time and effort to place the document sheets one by one on the place-reading contact glass while opening and closing the cover. In order to realize high speed reading, the reading device may include a document feeder unit (may also be referred to as an "automatic document feeder", a "DP", or an "ADF"), which feeds a plurality of document sheets to a reading position (feed-reading contact glass) automatically and successively.

Usually, a plurality of document sheets can be set on the document feeder unit. Then, the document feeder unit transports the document sheets one by one successively to the reading position. The reading device, emits light to the document sheets passing the feed-reading contact glass so as to read the document sheet (hereinafter referred to as "feed reading").

There is the reading device that includes the place-reading contact glass, the feed-reading contact glass, and the document feeder unit so as to be capable of performing both the place reading and the feed reading. Further, in this reading device, the document feeder unit can be opened and closed, and it functions as the cover to press downward the document on the place-reading contact glass.

Conventionally, in the reading device that is capable of performing both the place reading and the feed reading, when execution of a document reading job is instructed (by operation of a start key of an operation panel, for example), it is determined whether to perform the place reading or to perform the feed reading. For this determination, a part of the document feeder unit (document tray) on which the document sheets are set is provided with a sensor for detecting whether or not a document sheet is appropriately set (hereinafter referred to as a "document set sensor").

Conventionally, when execution of the document reading job is instructed, it is determined to read the document by feed reading in the case where the setting of the document sheet is detected based on an output of the document set sensor, while it is determined to read not the document transported by the document feeder unit but the document on the place-reading contact glass in the case where the setting of the document sheet is not detected.

However, conventionally, the document reading place is determined based on only the output of the document set sensor (based on only a detection result of the document set sensor whether or not the document sheet is detected). Therefore, there is a problem that document reading against user's intention may be executed.

For instance, conventionally, there is a case where the document set sensor cannot detect the setting of the document sheet because of a reason such that the set document position is deviated although the document is set on the document tray. In this case, conventionally, despite that the user desires to execute the feed reading, the place reading may be executed because the document set sensor cannot detect the setting of the document sheet.

Here, in the known image reading device described above, the notification for urging to check whether or not to perform the reading operation is performed based on only the elapsed time after the document table cover is closed, but it is not detected whether or not the document is placed. In addition, the image reading device is not a type that performs document transportation. In addition, it may be burdensome to response the notification in case where it is apparent that the place reading is to be performed. In other words, the image reading device itself does not determine but leaves the determination to the user for avoiding vacant scanning.

SUMMARY OF THE INVENTION

A reading device according to a first aspect of the present disclosure includes an image reading unit, a document feeder unit, a table document detection unit, a document set sensor, a size detection unit, an open/close detection unit, an input unit, a notifying unit, a history storing unit, and a determining unit. The image reading unit includes a place-reading contact glass on which a document to be read is placed and a feed-reading contact glass on which a transported document sheet passes, so as to perform document reading by one of place reading for reading the document placed on the place-reading contact glass and feed reading for reading the transported document sheet. The document feeder unit is capable of opening and closing with respect to the image reading unit, and configured to feed a document sheet set on a document tray and to transport the document sheet to the feed-reading contact glass. The table document detection unit is used for detecting whether or not there is a document on the place-reading contact glass. The document set sensor is a sensor for detecting whether or not a document sheet is set on the document tray in such a manner that the document feeder unit can feed the document sheet. The size detection unit is used for detecting a size of the document sheet set on the document tray. The open/close detection unit is used for detecting open and close of the document feeder unit. The input unit accepts an instruction to start the document reading. The notifying unit is configured to perform notification. The history storing unit stores history information about whether or not the document feeder unit is opened and closed in a period after a last document reading job is finished until the instruction to start the document reading is issued based on an output of the open/close detection unit. The determining unit detects whether or not there is a document on the place-reading contact glass based on an output of the table document detection unit, whether or not a document sheet is set on the document tray based on an output of the document set sensor, and a size of an object placed on the document tray based on an output of the size detection unit. In a determination necessary state in which the document set sensor does not detect that a document sheet is set on the document tray while the size detection unit detects an object on the document tray, the determining unit determines whether to execute the feed reading, or to execute the place reading, or to be disabled to confirm to execute the place reading or to execute the feed reading, based on whether or not there is a document on the place-reading contact glass and based on the history information.

Further features and advantages of the present disclosure will become apparent from the description of embodiments given below.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 illustrates an example of a determination table in the document reading by the reading device according to the embodiment.

DETAILED DESCRIPTION OF THE EMBODIMENTS

Now, embodiments of the present disclosure are described with reference to FIGS. 1 to 10. Further, in the following description, a multifunction peripheral 100 (corresponding to the image forming apparatus) including a reading device 1 is exemplified and described. However, elements such as structures and layouts described in the embodiments do not limit the scope of the disclosure and are merely examples for description.

(Outline of Image Forming Apparatus)

Figure 1:
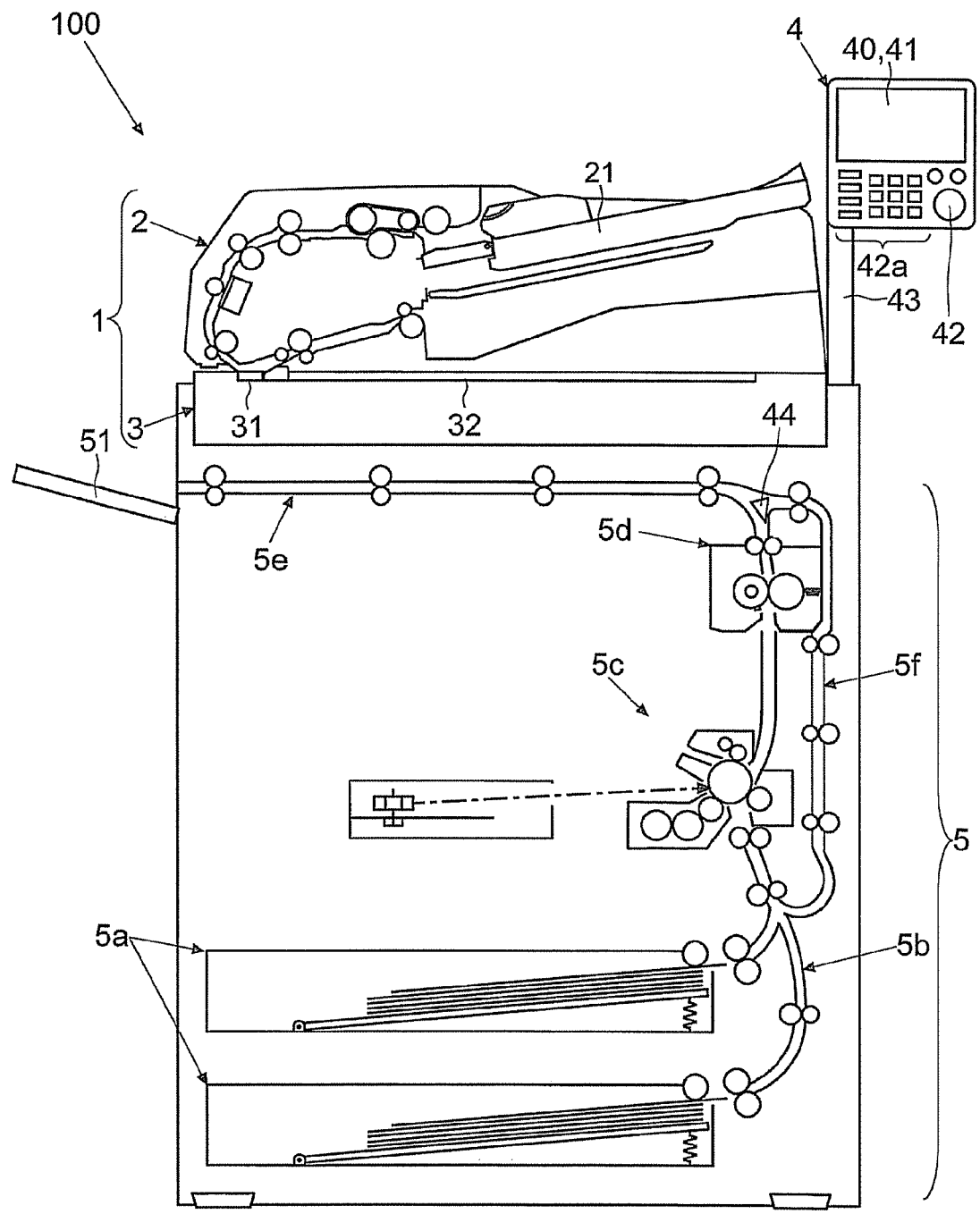
FIG. 1 is a diagram illustrating an example of a multifunction peripheral according to an embodiment.

First, with reference to FIG. 1, an outline of the multifunction peripheral 100 according to the embodiment is described.

As illustrated in FIG. 1, the multifunction peripheral 100 of this embodiment is equipped with the reading device 1 including a document feeder unit 2 and an image reading unit 3 disposed on the upper part. In addition, the multifunction peripheral 100 includes an operation panel 4 disposed on a side part. In addition, the multifunction peripheral 100 includes a printing unit 5 inside, which includes a paper sheet feeder 5a, a first transport unit 5b, an image forming unit 5c, a fixing unit 5d, and a second transport unit 5e.

The operation panel 4 includes a display unit 40 (corresponding to the notifying unit), which displays a screen for setting, and various messages (such as instructions, error messages, and states of the multifunction peripheral 100) as notifications. The operation panel 4 includes a touch panel unit 41 (corresponding to the input unit) disposed on the display unit 40 and a hardware key 42a (corresponding to the input unit) such as a start key 42 for instructing to execute document reading or the like. Further, the operation panel 4 (such as the touch panel unit 41 and the start key 42) accepts the instruction to start the document reading as well as settings of conditions for printing or transmission such as types and sizes of the paper sheet and the document sheet.

When the document sheet is transported and read (in feed reading), the document feeder unit 2 transports the document sheets set on the document tray 21 one by one to a reading position (a feed-reading contact glass 31). In this case, the transported document sheet passes the feed-reading contact glass 31. In addition, a document to be read can be placed on the place-reading contact glass 32. When the placed document is read (as place reading), the document feeder unit 2 works as a cover to press down the document. The image reading unit 3 executes the feed reading or the place reading so as to generate image data of the document (details are described later).

As illustrated in FIG. 1, the paper sheet feeder 5a stores a plurality of paper sheets and sends out the paper sheet for printing. The first transport unit 5b guides the paper sheet fed from the paper sheet feeder 5a to the image forming unit 5c. The image forming unit 5c forms a toner image based on the image data and transfers the toner image onto the paper sheet. The fixing unit 5d heats and presses the paper sheet with the transferred toner image so as to fix the toner image to the paper sheet. The second transport unit 5e transports the paper sheet after passing through the fixing unit 5d and discharges the paper sheet onto the discharge tray 51. Thus, printing of one page is finished. Further, in double-sided printing, the paper sheet whose one side is printed is discharged from the fixing unit 5*d* and is transported downward through a transport unit for double-sided printing 5*f*. Then, the paper sheet is sent to the image forming unit 5*c* again via the first transport unit 5*b*.

(Structure of Reading Device 1)

Figure 2:
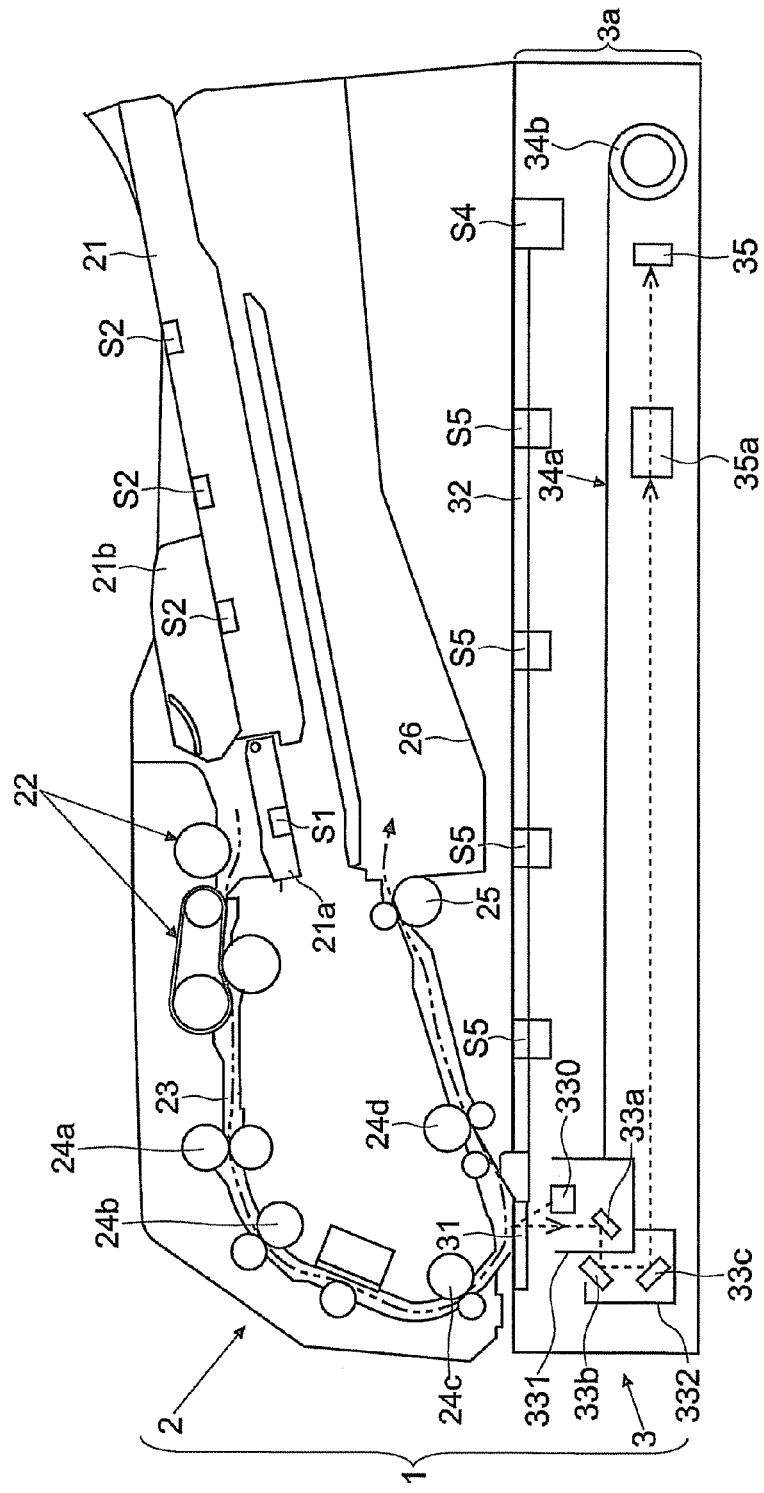
FIG. 2 is a diagram illustrating an example of a reading device according to the embodiment.

Next, with reference to FIG. 2, the reading device 1 according to the embodiment is described.

As described above, the reading device 1 includes the document feeder unit 2 and the image reading unit 3. First, the document feeder unit 2 transports the document sheets to be read one by one automatically and successively to the reading position (feed-reading contact glass 31). The document feeder unit 2 includes, in order from an upper stream in the document transport direction, the document tray 21, a document sheet feeder 22, a document transport path 23, a plurality of document transport roller pairs 24 (24*a* to 24*d*), a document discharge roller pair 25, and a document discharge tray 26. In addition, the document feeder unit 2 is capable of opening and closing with respect to the image reading unit 3. The document feeder unit 2 can open and close in such a manner that the front side swings in the up and down direction around a pivot behind the paper plane of FIG. 2 with respect to the image reading unit 3. Further, the document feeder unit 2 functions as a cover for pressing downward the contact glasses of the image reading unit 3.

The plurality of document sheets to be read by the feed reading are set on the document tray 21 so as to face upward. A part of the document tray 21 on the downstream side in the document transport direction is swingable (movable) around a swing axis. When the start key 42 is pressed to start the document reading or when it is detected that the document sheet is set on the document tray 21 (details of various detections are described later), an end of the movable part 21*a* on the downstream side in the document transport direction swings upward. In this way, the top document sheet among the document sheets set on the document tray 21 contacts with the document sheet feeder 22. When transportation of all the document sheets is finished or when the set document sheets are removed, the movable part 21*a* moves downward so that document sheets can be easily set (becomes the state as illustrated in FIG. 2).

When an input for executing the document reading such as touching of the start key 42 of the operation panel 4 is input to the multifunction peripheral 100, the document sheet feeder 22 sends out the document sheets one by one to the document transport path 23 for performing document sheet feeding. The document transport path 23 includes a plurality of document transport roller pairs 24 and a guide. The document transport roller pair 24 transports the document sheet sent out from the document tray 21. Then, the document transport path 23 transports the document sheet to pass the top surface of the feed-reading contact glass 31 on the top surface of the image reading unit 3. When the document sheet passes, the image reading unit 3 performs reading. In addition, the document discharge roller pair 25 discharges the document sheet after reading onto the document discharge tray 26.

Next, the image reading unit 3 is described. As illustrated in FIG. 1 and FIG. 2, the image reading unit 3 has a box-like casing. Further, on the left side of the top surface of the image reading unit 3, there is disposed the transparent plate-like feed-reading contact glass 31 extending in the direction perpendicular to the paper plane of FIG. 2, on which the transported document sheet passes. Further, on the right side of the top surface of the image reading unit 3, there is disposed the transparent plate-like place-reading contact glass 32 extending in the direction perpendicular to the paper plane. In case of reading a document like a book one by one page, the user lifts up the document feeder unit 2 and places (sets) the document on the place-reading contact glass 32 so that a surface to be read faces downward.

As illustrated in FIG. 2, the image reading unit 3 includes a reading mechanism 3*a* for reading the document in the casing. The reading mechanism 3*a* includes a first moving frame 331, a second moving frame 332, a wire 34*a*, a winding drum 34*b*, a lens 35*a*, a lamp 330 (such as an LED or a fluorescent tube) for irradiating the document with light, and an image sensor 35 to which light reflected by the document enters so as to read the document by line unit for generating image data. As the image sensor 35, a charge coupled device (CCD) type is used, in which photoelectric conversion elements are linearly aligned.

The first moving frame 331 includes the lamp 330 and a first mirror 33*a*. The second moving frame 332 includes a second mirror 33*b* and a third mirror 33*c*. The light emitted from the lamp 330 and reflected by the document is guided to the lens 35*a* via the first mirror 33*a*, the second mirror 33*b*, and the third mirror 33*c*. The light is condensed by the lens 35*a* and enters the image sensor 35. The image sensor 35 supports monochrome reading and color reading.

A plurality of wires 34*a* are attached to the first moving frame 331 and the second moving frame 332 (only one wire is illustrated in FIG. 2 for convenience sake). The other end of the wire 34*a* is connected to the winding drum 34*b*. Using a winding motor 3*m* (see FIG. 4) as a drive source, the winding drum 34*b* rotates in forward and reverse directions. Thus, the first moving frame 331 and the second moving frame 332 can be arbitrarily moved in the horizontal direction.

In the feed reading (for reading the document sheet transported by the document feeder unit 2), after the winding motor 3*m* is driven, the first moving frame 331 and the second moving frame 332 move from a home position and are fixed to a position below the feed-reading contact glass 31 (reading position). Then, the lamp 330 irradiates the passing document sheet with light. Then, light receiving elements of the image sensor 35 output analog electric signals corresponding to the reflection light.

On the other hand, in the place reading (for reading the document placed on the place-reading contact glass 32), the first moving frame 331 and the second moving frame 332 perform a scanning operation of moving from the home position in the horizontal direction (to the right) by the winding drum 34*b*, the wire 34*a*, and the like, continuously from the left end of the place-reading contact glass 32 to the end of the document. The image reading unit 3 generates image data of the read document based on an output of the image sensor 35.

(Hardware Structure of Multifunction Peripheral 100)

Figure 3:
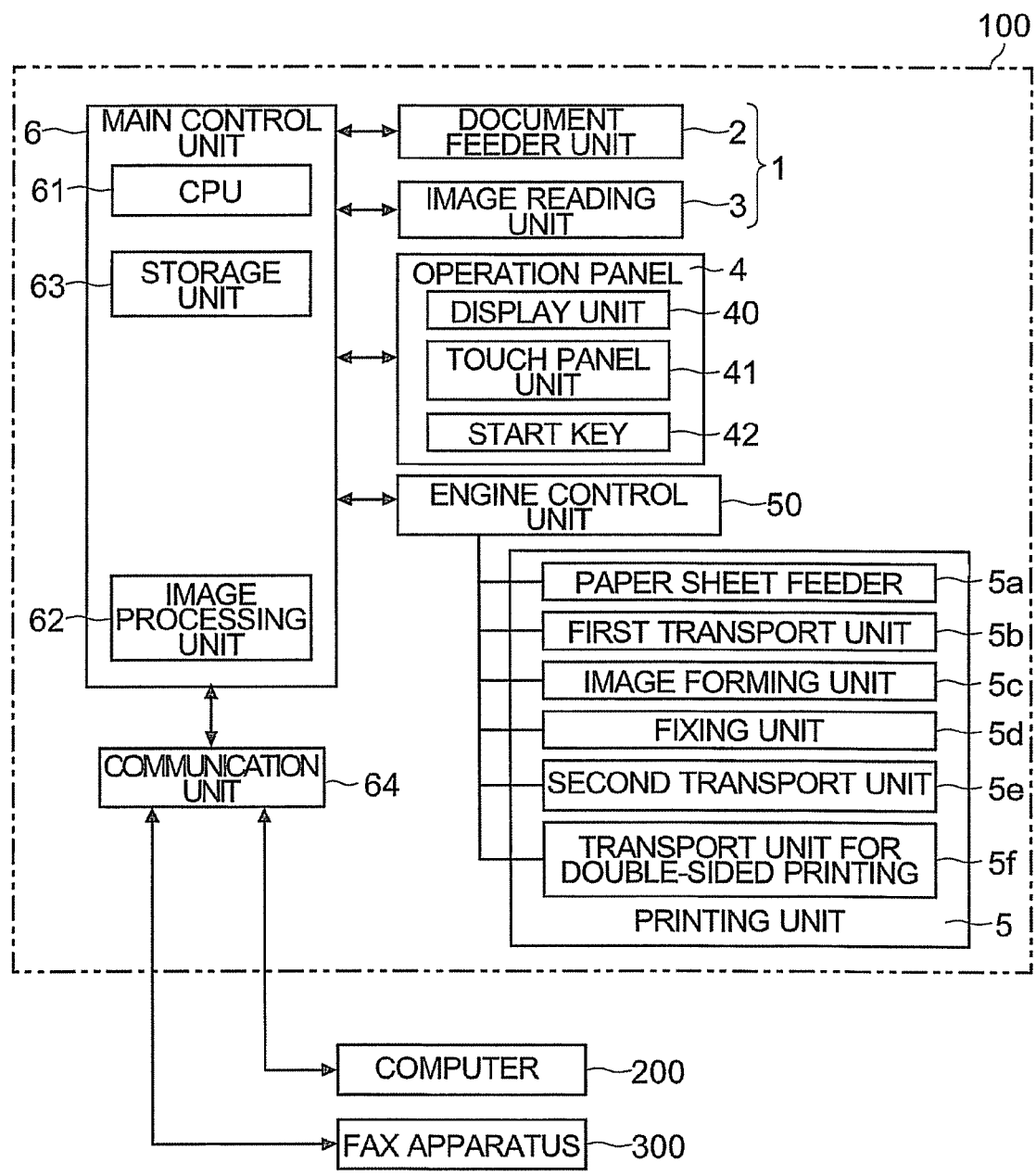
FIG. 3 is a diagram illustrating an example of a hardware structure of the multifunction peripheral according to the embodiment.

Next, with reference to FIG. 3, a hardware structure of the multifunction peripheral 100 according to the embodiment is described.

This multifunction peripheral 100 according to the embodiment includes a main control unit 6 inside. The main control unit 6 controls individual units of the apparatus. The main control unit 6 includes a CPU 61, an image processing unit 62 for generating image data used for printing or transmission, and other electronic circuits and elements.

The CPU 61 is a central processing unit, which performs control of the individual units of the multifunction peripheral 100 and calculation based on a control program and control data stored in a storage unit 63. The storage unit 63 is constituted of a combination of nonvolatile storage devices such as a ROM, a flash ROM, and an HDD and a volatile storage device such as a RAM.

The main control unit 6 is connected to an engine control unit 50 so as to be capable of communication. The main control unit 6 instructs the engine control unit 50 to perform image formation based on the setting made by the operation panel 4. The engine control unit 50 controls operation of the printing unit 5 (the paper sheet feeder 5a, the first transport unit 5b, the image forming unit 5c, the fixing unit 5d, the second transport unit 5e, and the transport unit for double-sided printing 5f) based on an instruction from the main control unit 6, for printing by transporting the paper sheet, forming the toner image, and transferring and fixing the toner image.

In addition, the main control unit 6 is connected to a communication unit 64. The communication unit 64 is an interface for performing communication with a computer 200 such as a personal computer or a server, or a FAX apparatus 300 via a network or a cable. The communication unit 64 receives data for printing containing image data and print setting from the computer 200. Further, the main control unit 6 controls the printing unit 5 to perform printing based on the data for printing (printer function). In addition, the communication unit 64 can transmit the image data based on document reading using the reading device 1 to the computer 200 or the FAX apparatus 300 (transmission function).

In addition, the main control unit 6 is connected to the reading device 1 (the image reading unit 3 and the document feeder unit 2) so as to be capable of communication. The main control unit 6 instructs the image reading unit 3 and the document feeder unit 2 to work, and the image reading unit 3 and the document feeder unit 2 work in accordance with the instruction.

In addition, the main control unit 6 controls operation of the display and the like of the operation panel 4. The main control unit 6 recognizes setting made by operation to the touch panel unit 41 and the hardware key 42a such as the start key 42, and the user's instruction so as to control the printing unit 5 and the reading device 1 to execute a job corresponding to the user's instruction.

(Operation Control of Reading Device 1)

Figure 4:
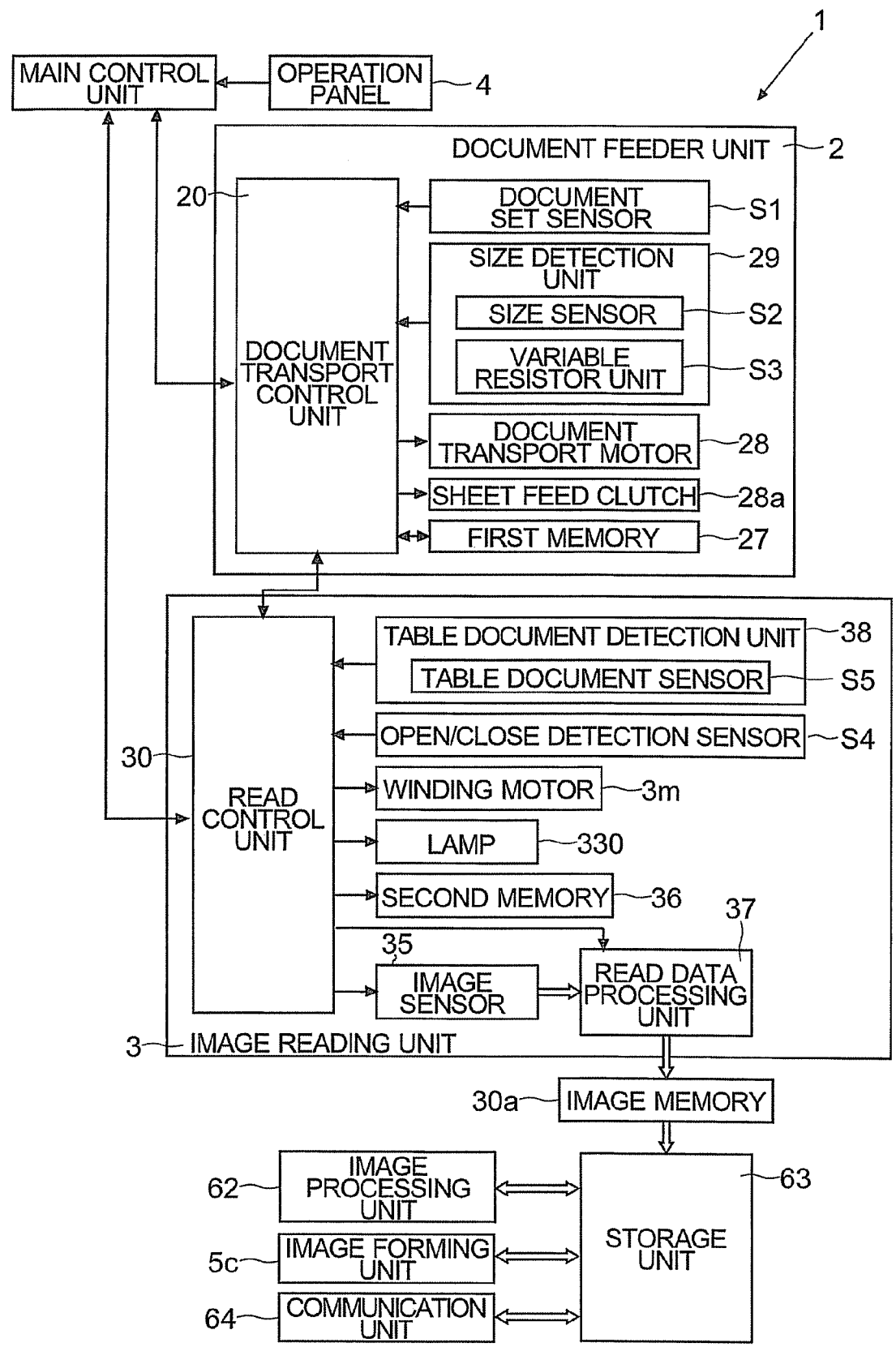
FIG. 4 is a diagram illustrating an example of the reading device according to the embodiment.

Next, based on FIG. 4, an operational control of the reading device 1 according to the embodiment is described.

The document feeder unit 2 is provided with a document transport control unit 20. The document transport control unit 20 is connected to the main control unit 6 and a read control unit 30 (corresponding to the determining unit) so as to be capable of communication. Further, the document transport control unit 20 performs operational control of members disposed in the document feeder unit 2 based on instructions and signals from the main control unit 6 and the read control unit 30 (details are described later).

On the other hand, the image reading unit 3 is provided with the read control unit 30. The read control unit 30 is connected to the main control unit 6 and the document transport control unit 20 so as to be capable of communication. Further, the read control unit 30 performs operational control of members disposed in the image reading unit 3 based on instructions and signals from the main control unit 6 and the document transport control unit 20.

The document transport control unit 20 is a circuit board including a circuit such as a central processing unit (CPU). In addition, the document feeder unit 2 is provided with a first memory 27 including a ROM and a RAM for storing a program and data for controlling the document feeder unit 2. The document transport control unit 20 controls the document feeder unit 2 using a storage content of the first memory 27.

When performing the feed reading, the document transport control unit 20 controls to drive a document transport motor 28. Thus, the document sheet feeder 22, the document transport roller pair 24, and the document discharge roller pair 25 rotate. Then, the document sheets on the document tray 21 are transported one by one. In order to secure a predetermined interval between the document sheets fed from the document tray 21 so that the document sheet is sent out at an appropriate timing, a sheet feed clutch 28a is disposed in the document feeder unit 2. When a predetermined time point for starting to feed the document sheet has come, the document transport control unit 20 connects the sheet feed clutch 28a, controls the document sheet feeder 22 to start the sheet feeding operation, releases the sheet feed clutch 28a before the next paper sheet feeding, and controls the document sheet feeder 22 to stop the sheet feeding operation.

Next, an operational control of the image reading unit 3 is described. The read control unit 30 is a circuit board including a circuit such as a central processing unit (CPU). In addition, the image reading unit 3 is provided with a second memory 36 (corresponding to the history storing unit) including a ROM and a RAM for storing a control program and data for the image reading unit 3. The read control unit 30 controls the image reading unit 3 by using a storage content of the second memory 36.

When reading the document by the feed reading or the place reading, the read control unit 30 controls the winding motor 3m to rotate. Thus, the first moving frame 331 and the second moving frame 332 moves via the winding drum 34b. In addition, when the document is read, the read control unit 30 controls the lamp 330, the image sensor 35, and a read data processing unit 37 to operate. The read data processing unit 37 is a part (circuit) for generating image data of the document based on outputs of the light receiving elements of the image sensor 35. The read data processing unit 37 amplifies the output values of the light receiving elements of the image sensor 35, performs ND conversion, and performs a correction process such as shading correction, so as to generate image data of the document.

The image data generated by the read data processing unit 37 is transmitted to the storage unit 63 via the image memory 30a for image data transmission. The image processing unit 62 performs image processing on the image data stored in the storage unit 63 in accordance with a type of the job and user's setting. The image data after the image processing is used for a job such as printing or transmission (is transmitted to an exposing device or the communication unit 64).

(Detection in Reading Device 1)

Next, with reference to FIG. 2 and FIG. 4, sensors disposed in the document feeder unit 2 and the image reading unit 3 are described.

(1) Detection of Document Setting on the Document Tray 21

As illustrated in FIG. 2 and FIG. 4, a document set sensor S1 is disposed for detecting whether or not a document sheet is set in such a manner that the document sheet feeder 22 can feed the document sheet (whether or not one or more document sheets are appropriately set on the document tray 21 of the document feeder unit 2).

As illustrated in FIG. 2, the document set sensor S1 is disposed on the document tray 21. More specifically, the document set sensor S1 is disposed within a range covered by a smallest paper sheet that can be set on the document tray 21 according to specification.

The document set sensor S1 is a sensor for detecting whether or not the document sheet is set on the document tray 21 in such a manner that the document sheet can be sent out from the document sheet feeder 22. Further, an output of the document set sensor S1 changes depending on whether or not there is a document sheet in a detection area (detection position). For instance, the document set sensor S1 may be a transparent type photosensor, which includes a contact piece that contacts with the set document sheet so as to change its position, and switches between a light blocking state and a light non-block state due to the position change of the contact piece depending on presence or absence of the document sheet. In addition, the document set sensor S1 may be a reflection type photosensor that irradiate the document sheet with light, receives reflection light from the document, and changes its output depending on presence or absence of the document sheet. In addition, the document set sensor S1 may be a mechanical switch whose output changes depending on whether or not the document sheet contacts with the sensor.

The output of the document set sensor S1 is supplied to the document transport control unit 20. The document transport control unit 20 detects whether or not the document sheet is set on the document tray 21 based on the output of the document set sensor S1 (based on whether the output of the document set sensor S1 is High or Low). Note that it is possible to configure to supply the output of the document set sensor S1 to the read control unit 30 so that the read control unit 30 detects whether or not the document sheet is appropriately set on the document tray 21.

Note that data used for detecting whether or not the document sheet is set by the document set sensor S1 is stored in the first memory 27. The document transport control unit 20 refers to the data stored in the first memory 27 so as to detect whether or not the document sheet is set.

(2) Detection of a Size of the Document Sheet Set on the Document Tray 21

The document feeder unit 2 is provided with a size detection unit 29 (such as size sensors S2) for detecting a size of the document sheet placed (set) on the document tray 21.

The size detection unit 29 includes a plurality of size sensors S2 for detecting a size in the document transport direction of the document set on the document tray 21. The plurality of size sensors S2 are disposed along the document transport direction on the top surface of the document tray 21. Each size sensor S2 can detect whether or not an object (such as the document sheet) exists on the top surface. An output of each size sensor S2 differs depending on whether or not there is the object above. Similarly to the document set sensor S1, each size sensor S2 may be a transparent type photosensor, a reflection type photosensor, or a mechanical switch.

Outputs of the size sensors S2 are supplied to the document transport control unit 20. The document transport control unit 20 detects a size (range) in the document transport direction of the document sheet on the document tray 21 based on the outputs of the size sensors S2 (based on whether each output of the size sensors S2 is High or Low). In FIG. 2, when the document sheet is set, the document transport control unit 20 recognizes that the size in the sub-scanning direction of the document sheet is larger than or equal to the width from the rightmost size sensor S2 that detects the document sheet to the left end of the document tray 21 and is smaller than the width from the leftmost size sensor S2 that does not detect the document sheet to the left end of the document tray 21. In other words, the document transport control unit 20 recognizes a range of the length in the sub-scanning direction of the document sheet based on the outputs of the size sensors S2. Note that it is possible to configure to supply the outputs of the size sensors S2 to the read control unit 30 so that the read control unit 30 detects a size of the document sheet set on the document tray 21.

In addition, the size detection unit 29 includes a variable resistor unit S3. The variable resistor unit S3 functions as a sensor for detecting a size of the document sheet in a direction perpendicular to the document transport direction (a front and rear direction of the reading device 1 or a main scanning direction) of the document sheet set on the document tray 21.

Specifically, on the top surface of the document tray 21, there are a pair of restricting plates 21b for restricting a document position in the front and rear direction of the reading device 1 (perpendicular to the document transport direction) (see FIG. 2). The pair of restricting plates 21b move to slide in a symmetric manner with respect to a predetermined center line. The pair of restricting plates 21b slide so as to sandwich the document sheet for restricting the document position. A slide mechanism of the pair of restricting plates 21b (not shown) is connected to a movable terminal (resistance adjusting terminal) of the variable resistor. Then, a resistance of the variable resistor varies in accordance with a position of the pair of restricting plates 21b. Thus, an output value of the variable resistor unit S3 varies in accordance with the position of the pair of restricting plates 21b.

The output of the variable resistor unit S3 is supplied to the document transport control unit 20. The document transport control unit 20 precisely detects a size of the document sheet in the main scanning direction (front and rear direction) based on the output value of the variable resistor unit S3. Then, the document transport control unit 20 checks the size in the sub-scanning direction of the document sheet detected by the size sensors S2 and the size in the main scanning direction, so as to recognize a corresponding fixed form of the paper sheet size. Note that data used for detecting the size of the document sheet in the up and down direction and in the left and right direction is stored in the first memory 27. The document transport control unit 20 refers to the data stored in the first memory 27 so as to detect the size of the document sheet.

(3) Detection of Open/Close of the Document Feeder Unit 2

Next, detection of open/close of the document feeder unit 2 is described. In the multifunction peripheral 100 (reading device 1) of this embodiment, the document feeder unit 2 can be opened and closed so that a document can be placed on the place-reading contact glass 32. For opening and closing the document feeder unit 2, a swing shaft (hinge) is disposed (not shown) at the rear side of the multifunction peripheral 100.

Further, in order to detect open/close of the document feeder unit 2, as illustrated in FIG. 2 and FIG. 4, the image reading unit 3 is provided with an open/close detection sensor S4 (corresponding to the open/close detection unit). Further, a part of the open/close detection sensor S4 is exposed to the top surface of the image reading unit 3 for open/close detection. The open/close detection sensor S4 includes a protruding part (not shown) biased to protrude upward. Then, an output of the open/close detection sensor S4 changes based on whether or not a protruding amount of the protruding part is larger than a predetermined value.

As the opened (lifted) document feeder unit 2 is being closed (lowered), an underside of the document feeder unit 2 contacts with the protruding part so that the protruding part is pressed into the open/close detection sensor S4. As the document feeder unit 2 is being closed, the pressed amount of the protruding part is being increased. When the protruding amount of the protruding part becomes smaller than the predetermined value, the output of the open/close detection sensor S4 changes from an open state value to a close state value.

On the other hand, as the closed (lowered) document feeder unit 2 is being opened (lifted), the protruding amount of the protruding part is being increased. When the opened amount of the document feeder unit 2 increases so that the protruding amount of the protruding part becomes larger than the predetermined value, the output of the open/close detection sensor S4 changes from the close state value to the open state value.

With respect to an angle between the underside of the document feeder unit 2 and the top surface of the image reading unit 3 (place-reading contact glass 32) being a certain angle (predetermined angle) of approximately 15 to 45 degrees, the output value of the open/close detection sensor S4 changes (from High to Low, or from Low to High). The output of the open/close detection sensor S4 is supplied to the read control unit 30. When the output of the open/close detection sensor S4 changes from the close state value to the open state value and then changes again to the close state value (for example, changes from Low to High, and then to Low), the read control unit 30 detects that the document feeder unit 2 is opened and closed.

Here, the second memory 36 (history storing unit) in the image reading unit 3 stores history information indicating whether or not the document feeder unit 2 is opened and closed based on the output of the open/close detection unit (open/close detection sensor S4) during a period from the end of a job accompanying document reading such as copying or transmission until an instruction to start a next document reading (such as an execution start instruction of the copying or transmission job by pressing the start key 42). In addition, the second memory 36 may store the history information indicating whether or not the document feeder unit 2 is opened and closed in a period from main power on or recovery from a power save mode (power supply to the reading device 1 and the image reading unit 3 is restarted from a state where the power supply to them is entirely or partially stopped) until an instruction to start the document reading.

(4) Detection of Presence or Absence of a Document on the Place-Reading Contact Glass 32

As illustrated in FIG. 2 and FIG. 4, the image reading unit 3 is provided with a table document detection unit 38 for detecting whether or not a document is placed on the place-reading contact glass 32 (whether or not the document is set on the place-reading contact glass 32), and for detecting a size of the placed document.

The table document detection unit 38 detects a size in the sub-scanning direction of the document set on the place-reading contact glass 32. In order to detect the size, the table document detection unit 38 includes a plurality of table document sensors S5. Each table document sensor S5 is a sensor for detecting whether or not there is a document on the top surface. For instance, the table document sensors S5 are disposed below the place-reading contact glass 32 along the rear side end (upper side end when the place-reading contact glass 32 is viewed from above).

An output of each table document sensor S5 differs depending on whether or not the document is detected. Each table document sensor S5 may be one that can detect the document without preventing the document reading (for example, a reflection type photosensor).

Outputs of the table document sensors S5 are supplied to the read control unit 30. The read control unit 30 detects a range of the size in the sub-scanning direction of the document on the place-reading contact glass 32 based on the outputs of the table document sensors S5 (based on whether each output of the table document sensors S5 is High or Low).

Note that in the reading device 1 of this embodiment, the document is placed on the basis of the left end of the place-reading contact glass 32.

In FIG. 2, a right end of the document exists between the rightmost table document sensor S5 that detects the document and the leftmost table document sensor S5 that does not detect the document. Therefore, the read control unit 30 detects that the size in the sub-scanning direction of the document is larger than a width from the rightmost table document sensor S5 that detects the document to the left end of the place-reading contact glass 32 and is smaller than a width from the leftmost table document sensor S5 that does not detect the document to the left end of the place-reading contact glass 32.

In addition, the table document sensor S5 can also be used for detecting whether or not the document is placed on the place-reading contact glass 32. Therefore, the read control unit 30 detects that there is a document placed on the place-reading contact glass 32 when an output value of one of the plurality of table document sensors S5 is the value detecting the document.

The size detection and the detection of presence or absence of a document using the table document sensors S5 may be performed at a predetermined period. In addition, it is necessary to lift up the document feeder unit 2 for setting a document on the place-reading contact glass 32. Therefore, the read control unit 30 may control as follows. When it is detected that the document feeder unit 2 is closed to a predetermined angle (that the output value of the open/close detection sensor S4 changes to the output value indicating that the document feeder unit 2 is closed) after detecting that the document feeder unit 2 is opened based on the output of the open/close detection sensor S4, the document transport control unit 20 checks output values of the table document sensors S5 so as to detect whether or not a document is placed on the place-reading contact glass 32, and a size in the sub-scanning direction of the placed document.

In addition, in the reading device 1 of this embodiment, when the operation of closing the document feeder unit 2 is performed, prescanning is performed. The prescanning is a reading operation for detecting a size in the main scanning direction of the document placed on the place-reading contact glass 32.

The image reading unit 3 performs the prescanning by a trigger of closing the document feeder unit 2 to be smaller than the predetermined angle (the output value of the open/close detection sensor S4 changes to the output value indicating that the document feeder unit 2 is closed) after detecting that the document feeder unit 2 is opened. In other words, the image reading unit 3 performs the prescanning in a state where the document feeder unit 2 is a little opened before being completely closed.

Further, when the prescanning is performed, the image reading unit 3 operates the winding motor 3*m* so that the first moving frame 331 and the second moving frame 332 are moved to a prescanning position below the place-reading contact glass 32. Note that after the prescanning is finished (also after the scanning of the place reading or the feed reading is finished), the read control unit 30 operates the winding motor 3*m* so that the first moving frame 331 and the second moving frame 332 return to the home position.

In a part where there is the document, light from the lamp 330 is reflected by the document. Therefore, in the document image data obtained by the prescanning, pixels of positions corresponding to the part where there is the document are bright (whitish). On the other hand, in a part where there is not the document, light from the lamp 330 is not reflected but is diffused. Therefore, pixels of the part where there is not the document are dark. Therefore, the read control unit 30 detects a boundary between pixels having darker (larger) values than a threshold value and pixels having values brighter (smaller) than or equal to the threshold value on a main scanning direction line in the prescanned image data. Then, the read control unit 30 can substantially correctly detect a size in the main scanning direction of the document based on the number of pixels having pixel values larger than or equal to the threshold value and a distance from the boundary to the upper end (rear end) or the lower end (front end) of the place-reading contact glass 32.

On the other hand, when there is no pixel or almost no pixel brighter than the threshold value in the prescanned image data, it is considered that a document is not placed on the place-reading contact glass 32. Therefore, the image reading unit 3 determines that a document is not set on the place-reading contact glass 32 when the boundary cannot be determined or when the number of pixels brighter than the threshold value is a predetermined number or smaller.

In this way, it is possible to detect whether or not a document is set (there is a document) on the place-reading contact glass 32 by the prescanning. Therefore, the image reading unit 3 may detect whether or not a document is set on the place-reading contact glass 32 based on a result of the prescanning without disposing the table document sensors S5.

Data indicating whether or not a document is placed on the place-reading contact glass 32 and a size of the document placed on the place-reading contact glass 32 is stored in the second memory 36. The read control unit 30 updates the storage content of the second memory 36 at any time in accordance with a result of the detection. In this way, the reading device 1 is provided with the table document sensors S5 and the reading mechanism 3a for performing the prescanning, as the table document detection unit 38 for detecting whether or not there is a document on the place-reading contact glass 32.

(Flow of Document Reading Determination)

Next, with reference to FIG. 5 to FIG. 10, document reading determination in the reading device 1 according to the embodiment is described.

Figure 5:
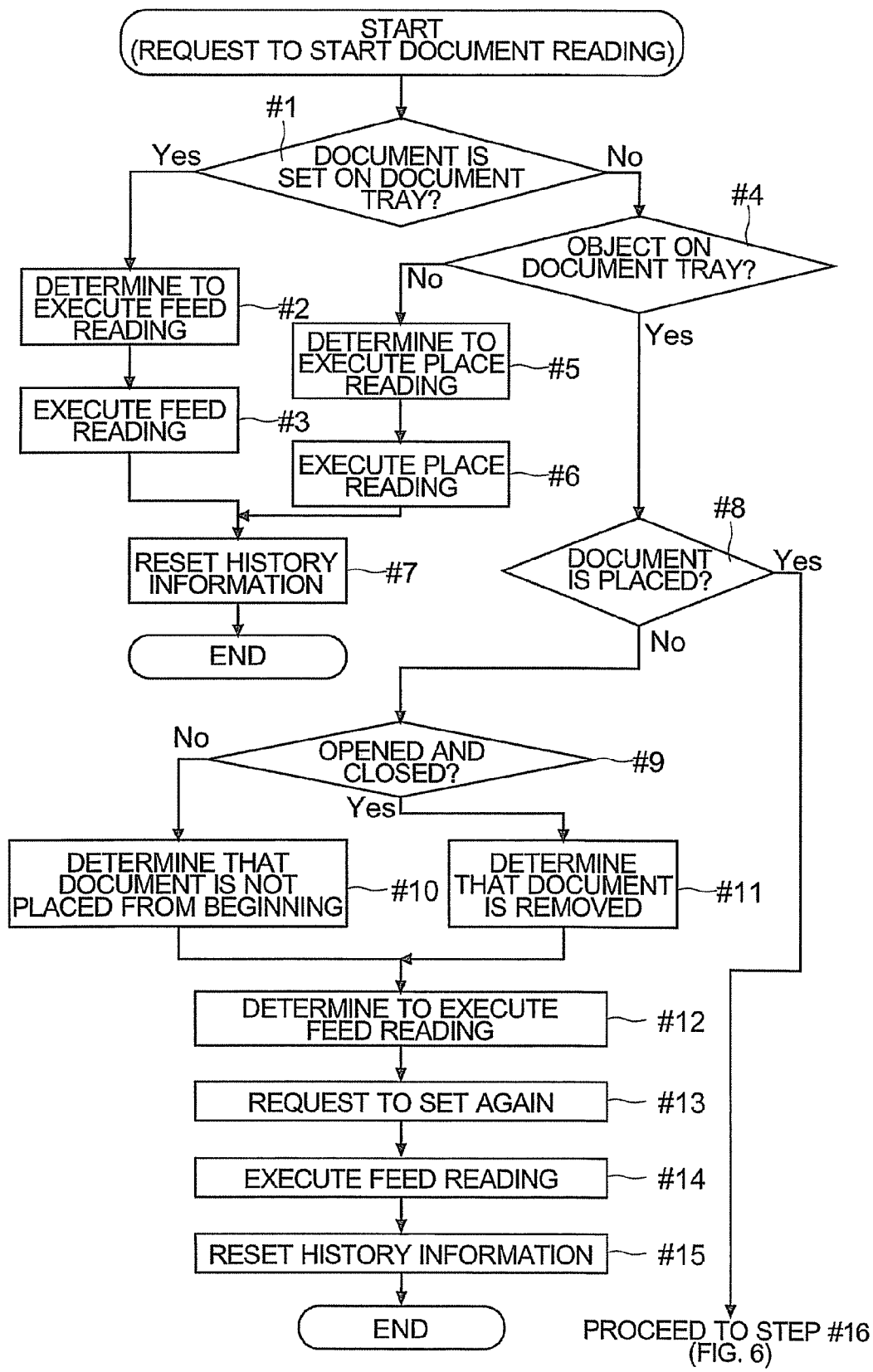
FIG. 5 is a flowchart illustrating an example of a determination flow of document reading by the reading device according to the embodiment.
Figure 6:
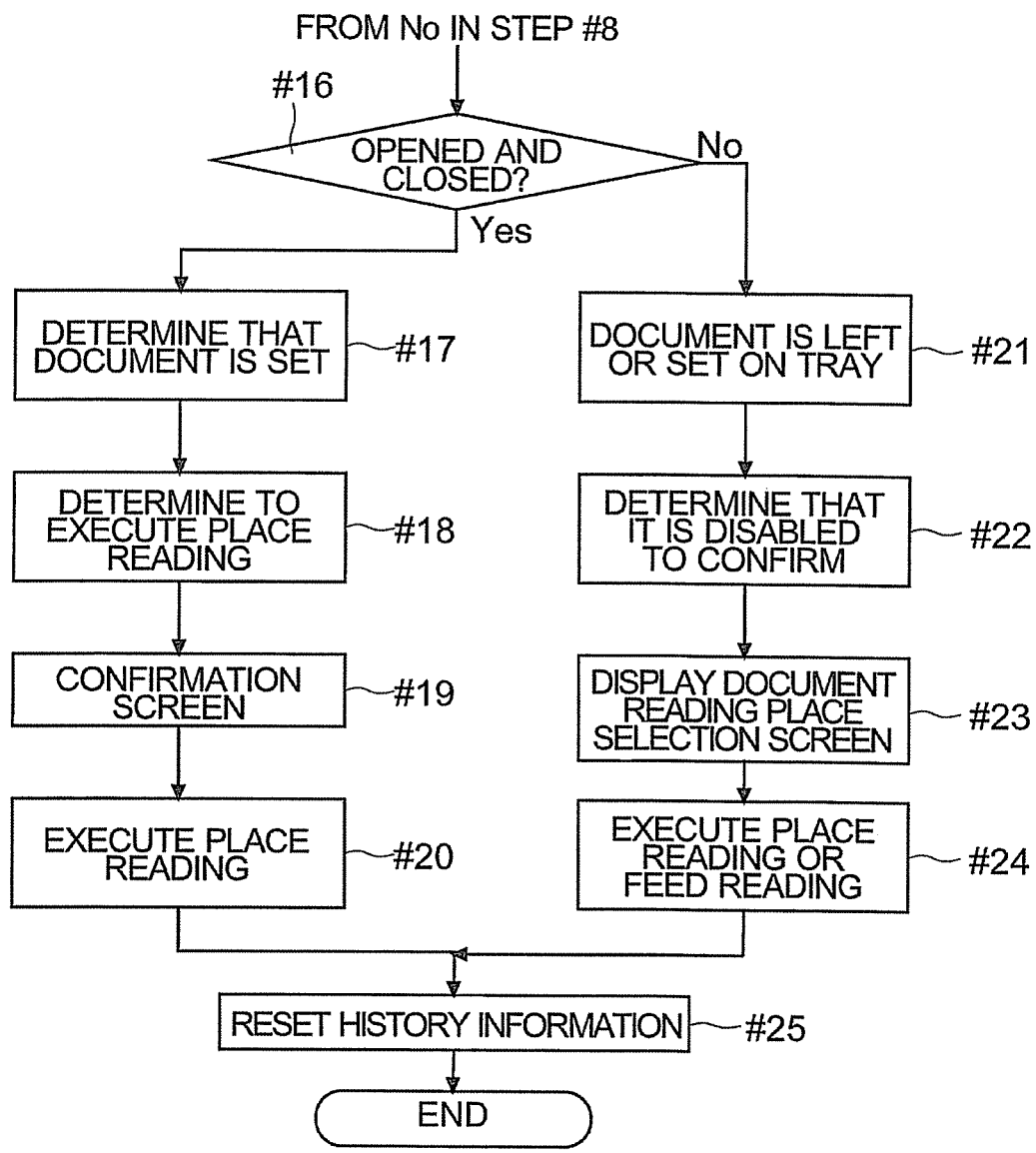
FIG. 6 is a flowchart illustrating an example of the determination flow of the document reading by the reading device according to the embodiment.

First, a process of a flowchart illustrated in FIG. 5 starts when an instruction to execute a job accompanying the document reading such as copying or transmission is input to the operation panel 4, so that the read control unit 30 and the document transport control unit 20 receive a request to start the document reading from the main control unit 6.

When receiving the request to start the document reading, the read control unit 30 performs communication with the document transport control unit 20 and checks whether or not a document is set on the document tray 21 (Step #1). Specifically, the read control unit 30 controls the document transport control unit 20 to check the output of the document set sensor S1 and receives a result of the detection.

When the document set sensor S1 detects that the document is set at a time point of starting the job accompanying the document reading (Yes in Step #1), it is possible to determine that a document sheet is set on the document tray 21 in such a manner that the document sheet feeder 22 can feed the document sheet. Therefore, the read control unit 30 determines to perform the feed reading (see detection result (1) in FIG. 7, Step #2). Then, the read control unit 30 instructs the document transport control unit 20 to transport the document, and the image reading unit 3 and the document feeder unit 2 execute feed reading (Step #3).

On the other hand, when the document set sensor 51 does not detect that the document is set at the time point of starting the job accompanying the document reading (No in Step #1), the read control unit 30 performs communication with the document transport control unit 20 and checks whether or not the size detection unit 29 (size sensor S2) detects an object placed on the document tray 21 (whether or not one of the size sensors S2 outputs the output value in the state where a document sheet is detected) (Step #4). Specifically, the read control unit 30 controls the document transport control unit 20 to check outputs of the size sensors S2 and receives a result of the detection.

When it is recognized that there is nothing placed on the document tray 21 by checking the output of the size detection unit 29 (the size sensors S2) (No in Step #4), it can be determined that there is nothing placed on the document tray 21. Therefore, the read control unit 30 determines to perform the place reading (see detection result (2) in FIG. 7, Step #5). Then, the read control unit 30 does not instruct the document transport control unit 20 to transport a document sheet, and the image reading unit 3 executes the place reading (Step #6).

Then, the document reading is started in Step #3 and Step #6. When all the document sheets are read in the job, the read control unit 30 controls the second memory 36 to reset the history information (Step #7 to END). In other words, the read control unit 30 controls the second memory 36 to update the history information value to a value indicating "not open and close".

On the other hand, when it is recognized that there is an object on the document tray 21 (Yes in Step #4, a determination necessary state), the read control unit 30 checks whether or not a document is placed on the place-reading contact glass 32 (Step #8). Specifically, the read control unit 30 checks whether or not a document is set (placed) on the place-reading contact glass 32 based on output values of the table document sensors S5 or a result of the prescanning.

When a document is not placed on the place-reading contact glass 32 (No in Step #8), the read control unit 30 refers to an open and close history stored in the second memory 36, and checks whether or not the document feeder unit 2 is opened and closed from an end of the job accompanying the document reading until the present time point (Step #9).

In addition, in the determination necessary state (Yes in Step #4), when it is detected that there is no document on the place-reading contact glass 32 with the history information indicating that the document feeder unit 2 is not opened and closed (No in Step #9), it is estimated that a document is not placed on the place-reading contact glass 32 from beginning. Therefore, when the document feeder unit 2 is not opened and closed (No in Step #9), the read control unit 30 determines that a document is not set on the place-reading contact glass 32 from beginning (Step #10, see detection result (3) in FIG. 7).

In addition, in the determination necessary state (Yes in Step #4), when it is detected that there is no document on the place-reading contact glass 32 (No in Step #8) with the history information indicating that the document feeder unit 2 is opened and closed (Yes in Step #9), it is estimated that a document is removed from the place-reading contact glass 32. Therefore, when the document feeder unit 2 is opened and closed (Yes in Step #9), the read control unit 30 determines that the document read in the last job is removed from the place-reading contact glass 32 (Step #11, see detection result (4) in FIG. 7).

In the case of Step #10 and Step #11, there is no document on the place-reading contact glass 32, and hence it can be determined that it is no use to execute the place reading. Therefore, after Step #10 and Step #11, the read control unit 30 determines to execute the feed reading (Step #12). In other words, in the determination necessary state (Yes in Step #4), in case of No in Step #8, and in case of Yes in Step #9 or No in Step #9, it is determined to read a document by the feed reading. Thus, in a state where there is no document on the place-reading contact glass 32, it is determined to execute the feed reading (document reading by the document feeder unit 2). Conventionally, when an instruction to execute reading is issued, the place reading is executed only by a reason that the document set sensor S1 cannot detect setting of the document, and hence document reading against user's intention is executed. However, the document reading in a place where there is no document is not performed. As a result, the document reading against user's intention is not performed.

However, because the document set sensor S1 does not detect setting of a document, a document sheet is not sent out from the document tray 21 even if feeding and transport of the document sheet is started. Therefore, the read control unit 30 controls the display unit 40 to notify a reset request (Step #13).

Figure 8:
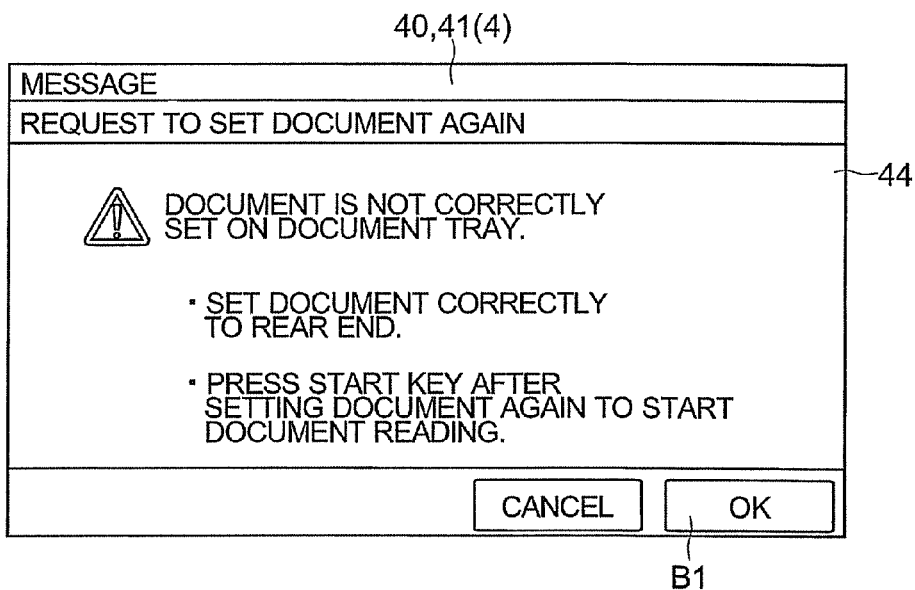
FIG. 8 is a diagram illustrating an example of a reset request screen when determining to execute feed reading.

Here, with reference to FIG. 8, the reset request is described. The read control unit 30 controls the display unit 40 to display a reset request screen 44 as illustrated in FIG. 8 and to notify the reset request. As illustrated in FIG. 8, the read control unit 30 controls the display unit 40 to display a massage for urging the user to correctly set a document in the reset request screen 44. Thus, the user can recognize that a document is not appropriately set and should be reset.

Then, the reset request screen 44 displays a message to operate the start key 42 again after setting the document again in the case where the document reading can be performed by the feed reading. Further, when the start key 42 is operated, a message to start the feed reading is displayed on the display unit 40.

When the start key 42 is operated (or when an OK button B1 in the screen is pressed), the document transport control unit 20 and the read control unit 30 control to perform processing and operation for the feed reading, and the document feeder unit 2 and the image reading unit 3 perform the feed reading in the case where setting of a document is detected by based on the output of the document set sensor S1 (Step #14). Note that when the start key 42 is pressed, and when the setting of a document is not detected by the document set sensor S1, the display unit 40 should display the reset request screen 44 again. In addition, when there is no intention of performing the feed reading, a reset key (not shown), a clear key (not shown), or a cancel key disposed on the operation panel 4 or displayed on the display unit 40 should be pressed to cancel the state of waiting for execution of the feed reading.

Note that when it is detected that a document is set by the document set sensor 51 based on the output of the document set sensor S1 after the reset request screen 44 is displayed (without pressing the start key 42), the feed reading may be automatically started. In this case, it is not necessary to display the message indicating that the feed reading is started when the start key 42 is pressed on the reset request screen 44. The document transport control unit 20 detects that a document is set on the document set sensor S1 and transmits a result of the detection to the read control unit 30. Then, the document transport control unit 20 and the read control unit 30 control to perform the process and operation of the feed reading when receiving the signal indicating that a document is set.

In this way, after Step #10 and Step #11, the notifying unit (display unit 40) requests to reset the document on the document tray 21. After the reset request, when the determining unit (read control unit 30) detects that a document is set on the document tray 21, the document feeder unit 2 starts to feed and transport a document sheet automatically or after the input unit (such as the touch panel unit 41 or the start key 42) receives the instruction to start the document reading, and the image reading unit 3 performs the reading of the document sheet passing the feed-reading contact glass 31 so as to generate the image data. Thus, in the case where the reading of the place-reading contact glass 32 is automatically performed in the conventional structure, it is possible to give the user a chance to reset the document in the present disclosure. Therefore, it is possible to correctly determine that the user desires reading of the document on the document tray 21, to urge to reset, and to perform the feed reading according to users intention. Thus, wasteful reading can be avoided.

When reading of all document sheets in the job is finished by the feed reading in Step #14, the read control unit 30 controls the second memory 36 to reset the history information (Step #15 to END). In this way, the history information becomes correct information indicating whether or not the document feeder unit 2 is opened and closed for resetting the document.

In addition, also when a document is placed on the place-reading contact glass 32 (Yes in Step #8), the read control unit 30 checks the open and close history stored in the second memory 36 and checks whether or not the document feeder unit 2 is opened and closed in a period from the end of the last job accompanying the document reading until the present time point (Step #16).

In the determination necessary state (Yes in Step #4), when it is detected that there is a document on the place-reading contact glass 32, and when the document feeder unit 2 is opened and closed (when the history information indicates that the document feeder unit 2 is opened and closes, Yes in Step #16), it is confirmed that there is the document on the place-reading contact glass 32 after the document feeder unit 2 is opened and closed. Therefore, the read control unit 30 determines that the document is reset on the place-reading contact glass 32 or there is a newly set document (Step #17, see detection result (5) in FIG. 7). In other words, it is estimated that the user has set the document on the place-reading contact glass 32 for performing the place reading after the last reading.

Therefore, in the determination necessary state, the determining unit (read control unit 30) determines to perform the place reading when it is detected that there is a document on the place-reading contact glass 32 with the history information indicating that the document feeder unit 2 is opened and closed (Step #18). In this way, when it is recognized that there is a document on the place-reading contact glass 32 and it is recognized that the document is set on the place-reading contact glass 32 by the user, it is determined to perform the place reading. Therefore, it is correctly determined whether or not to perform the place reading, and the reading according to user's intention is performed.

However, conventionally, Step #18 is also a state where setting of a document is not detected by the document set sensor S1 while it is detected by the size sensors S2 that an object is placed on the document tray 21 (see Step #4). For instance, it is considered that the user simply put the read document on the document tray 21 or that the user temporarily places a bag on the document tray 21 in order to make hands free for setting of the document reading. However, there is possibility that a document sheet is placed on the document tray 21 for the feed reading. Therefore, the read control unit 30 controls the display unit 40 to notify the confirmation screen (Step #19).

Figure 9:
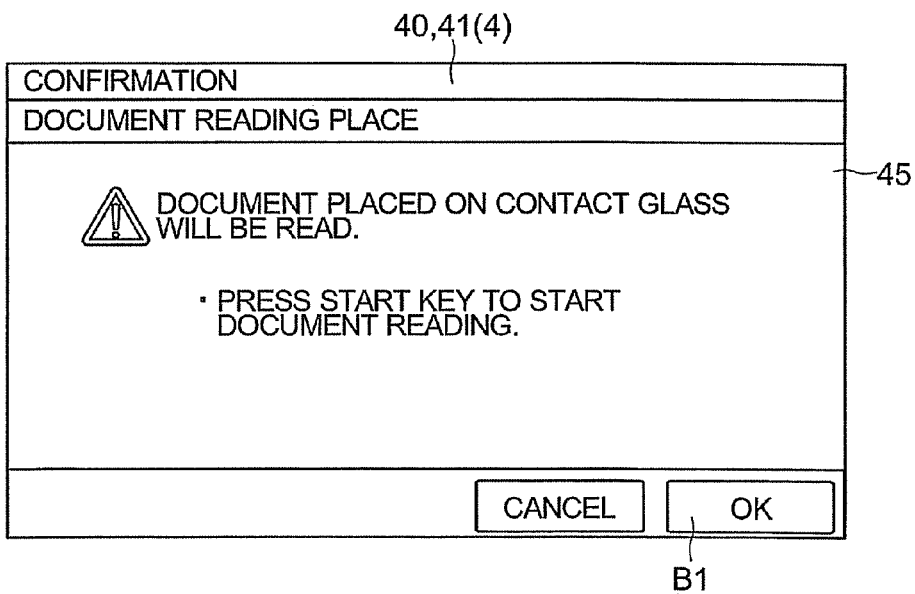
FIG. 9 is a diagram illustrating an example of a place reading confirmation screen when determining to execute place reading.

Here, with reference to FIG. 9, confirmation of the place reading is described. Specifically, the read control unit 30 controls the display unit 40 to display a place reading confirmation screen 45 as illustrated in FIG. 9 so as to notify confirmation of the place reading.

As illustrated in FIG. 9, the read control unit 30 controls the display unit 40 to display a message to the user for informing that the place reading is being performed in the place reading confirmation screen 45. In this way, the user can recognize that the reading by the place reading is being performed.

Then, the read control unit 30 controls the display unit 40 to display again a message to start the place reading when the start key 42 is operated as confirmation of intention to perform the place reading in the place reading confirmation screen 45.

When the start key 42 is pressed (or when the OK button B1 in the screen is pressed), the image reading unit 3 (read control unit 30) executes the place reading (Step #20). Note that unless the place reading is executed, the reset key (not shown), the clear key (not shown), or the cancel key disposed in the operation panel 4 or displayed in the display unit 40 should be pressed so as to cancel the present state and to reset the document on the document tray 21. Note that because it is very likely to perform the place reading, when determining to perform the place reading (Step #18), the image reading unit 3 (read control unit 30) may promptly execute the place reading without displaying the place reading confirmation screen 45 (by skipping Step #19).

In other words, in addition, when the determining unit (read control unit 30) determines to perform the place reading, the image reading unit 3 executes the reading of the document placed on the place-reading contact glass 32 so as to generate the image data, automatically or when an instruction to read the document placed on the place-reading contact glass 32 is input to the input unit (such as the touch panel unit 41 or the start key 42). In this way, in accordance with the situation (output states of the sensors), the place reading is performed as the user desires. Thus, it is possible to eliminate reading operation the user does not intend, so that wasteful reading is not performed.

In addition, in the determination necessary state (Yes in Step #4), when a document is placed on the place-reading contact glass 32 (the state of detecting that there is a document on the place-reading contact glass 32, Yes in Step #8), and when the open and close history indicates that the document feeder unit 2 is not opened and closed (the state where the history information is a history without open and close of the document feeder unit 2, No in Step #16), a document used in the last reading remains on the place-reading contact glass 32. On the other hand, this state is a state where the setting of the document is not detected by the document set sensor S1 while it is detected by the size sensor S2 that an object is placed on the document tray 21 (see Step #4). In addition, it is considered that a set position of the document on the document tray 21 is deviated. On the other hand, there is a document on the place-reading contact glass 32. Therefore, it is disabled to confirm whether the user wants to perform the place reading again or the user forgets to remove the document.

Therefore, when the document feeder unit 2 is not opened and closed (No in Step #16), the read control unit 30 determines that the document read in the last job is left on the place-reading contact glass 32 or the document is placed on the document tray 21 (Step #21, see detection result (6) in FIG. 7).

In this case, when the place reading is performed, the same document as that read in the last job is read again so that a wasteful job may be performed. On the other hand, there is a possibility that the user wants to read the same document again and presses the start key 42 (instructs to execute the document reading). In addition, when trying to perform the feed reading, document sheet transportation cannot be started because the document sheet is not appropriately set.

Therefore, in the determination necessary state (Yes in Step #4), when it is detected that there is a document on the place-reading contact glass 32 with the history information indicating no opening and closing, the determining unit (read control unit 30) determines that it is disabled to confirm to execute the place reading or to execute the feed reading (Step #22, see detection result (6) in FIG. 7). In this way, when it cannot be confirmed to read the document on the document tray 21 or to read the document on the place-reading contact glass 32, it is determined that it is disabled to confirm. Therefore, the place reading or the feed reading is not performed in the state where the user's intention is not confirmed about the document reading place. Therefore, the document reading against the user's intention can be avoided.

In this way, the determining unit (read control unit 30) detects whether or not there is a document on the place-reading contact glass 32 based on the output of the table document detection unit 38, whether or not a document sheet is set on the document tray 21 based on the output of the document set sensor S1, and a size of the document sheet set on the document tray 21 based on the output of the size detection unit 29. In the determination necessary state in which it is not detected that a document is set on the document tray 21 by the document set sensor S1 while an object on the document tray 21 is detected by the size detection unit 29, the determining unit (read control unit 30) determines whether to execute the feed reading, or to execute the place reading, or to be disabled to confirm to execute the place reading or to execute the feed reading, based on whether or not there is a document on the place-reading contact glass 32 and based on the history information.

In the determination necessary state (in which the document set sensor S1 does not detect the setting of the document (No in Step #1), and the size detection unit 29 (such as the size sensors S2) detects an object placed on the document tray 21, Yes in Step #4), there may be a case where a document is not correctly set, or a case where an object (such as a read document) placed on the document tray 21 is simply detected by the size detection unit 29 (such as the size sensors S2). Therefore, the set position of the document is determined automatically and correctly based on whether or not there is the document on the place-reading contact glass 32 and by referring to the history information. In this way, the document reading place (to execute the place reading or to execute the feed reading) can be correctly determined, and hence document reading against user's intention can be eliminated. In addition, it is also determined that it is disabled to confirm the document reading place (to execute the place reading or to execute the feed reading). Therefore, it is possible to avoid determining the document reading place in an uncertain state so as to execute the document reading against user's intention.

Then, the read control unit 30 controls the display unit 40 to notify the user to select the document reading place (to execute the place reading or to execute the feed reading) (Step #23).

Figure 10:
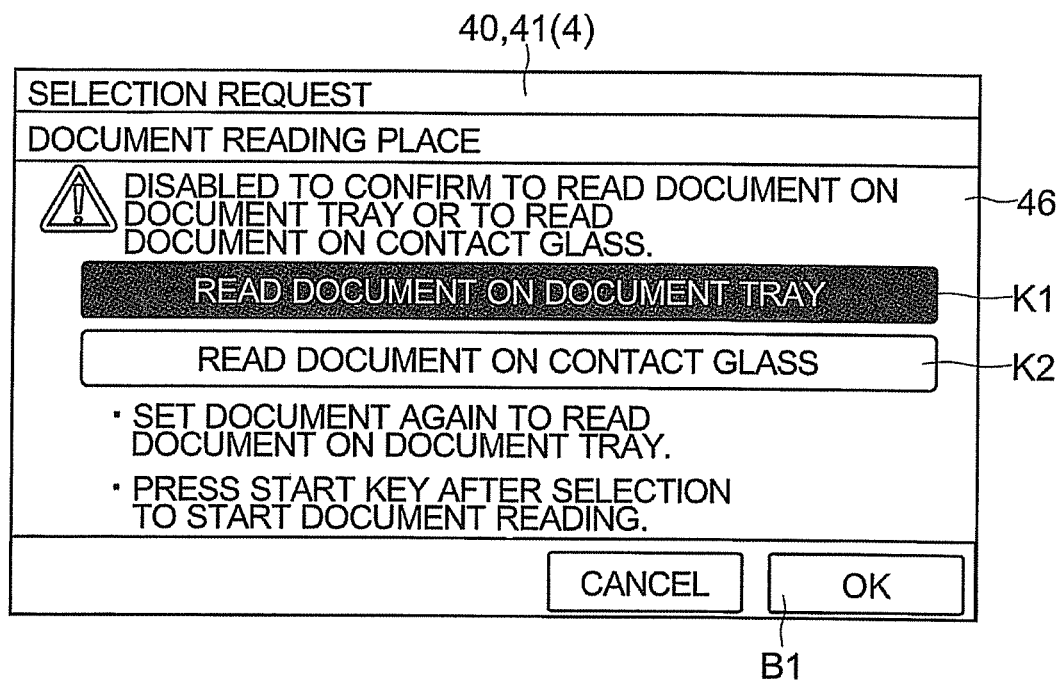
FIG. 10 is a diagram illustrating an example of a reading place selection screen when determining it is disabled to confirm.

Here, with reference to FIG. 10, the notification to select the document reading place is described. The read control unit 30 controls the display unit 40 to display the reading place selection screen 46 as illustrated in FIG. 10. As illustrated in FIG. 10, the read control unit 30 controls the display unit 40 to display a message indicating that it is disabled to confirm to execute the place reading or to execute the feed reading, a feed reading key K1 for selecting the feed reading, and a place reading key K2 for selecting the place reading on the reading place selection screen 46. In this way, it is possible, to let the user to recognize to select one of the feed reading and the place reading.

When the read control unit 30 receives a signal from the operation panel 4 indicating that the display position of the feed reading key K1 is touched, the read control unit 30 determines to execute the feed reading. In addition, when the read control unit 30 receives a signal from the operation panel 4 indicating that the display position of the place reading key K2 is touched, the read control unit 30 determines to execute the place reading. In this way, in accordance with the selected document reading place (operated selection key), the read control unit 30 determines to execute the feed reading or to execute the place reading. Note that considering the case where the feed reading is selected, the read control unit 30 controls the display unit 40 to display a message (reset request) urging the user to correctly set the document for feed reading.

In addition, in the reading place selection screen 46, after resetting the document, the display unit 40 displays a message indicating that it is necessary to press the start key 42 again as confirmation for executing the feed reading or the place reading.

When the feed reading is selected and the start key 42 is pressed (or when the OK button B1 in the screen is pressed), the document feeder unit 2 and the image reading unit 3 execute the feed reading in the case where the document set sensor S1 detects setting of the document (Step #24). In addition, when the place reading is selected and the start key 42 is pressed (or when the OK button B1 in the screen is pressed), the image reading unit 3 executes the place reading (Step #24). Note that when the user has no intention to perform the feed reading, the user should press the reset key (not shown), the clear key (not shown), or the cancel key disposed on the operation panel 4 or displayed on the display unit 40 so as to cancel the state waiting for execution of the feed reading.

Note that when the feed reading selection operation (touching of the display position of the feed reading key K1) is performed and the document set sensor S1 detects setting of the document, the feed reading may be automatically started. In addition, when the selection operation of the place reading (touching of the display position of the place reading key K2) is performed, the place reading may be automatically started. In other words, without an execution instruction such as pressing of the start key 42 again, the reading device 1 may execute the document reading. In this case, it is not necessary to display the message indicating that the feed reading is started when the start key 42 is pressed (or when the OK button B1 in the screen is pressed) in the reading place selection screen 46.

In this way, when the determining unit (read control unit 30) determines that it is disabled to confirm, the notifying unit (display unit 40) requests to select to execute the place reading or to execute the feed reading. When the input unit (such as the touch panel unit 41 or the start key 42) accepts a selection of executing the feed reading based on the selection request, after the determining unit (read control unit 30) detects based on the output of the document set sensor S1 that a document is set on the document tray 21, the document feeder unit 2 starts to feed and transport the document sheet automatically or after the input unit accepts the instruction to start the document reading. The image reading unit 3 reads the document sheet passing the feed-reading contact glass 31 so as to generate the image data. When the input unit accepts a selection of executing the place reading based on the selection request, the image reading unit 3 reads a document placed on the place-reading contact glass 32 so as to generate the image data. In this way, when a set position of the document to be read should not be easily determined, it is possible to perform the document reading based on the set position of the document selected by the user. In addition, the document reading according to user's intention is performed also in the case where it is disabled to confirm to execute the place reading or to execute the feed reading.

After Step #20 and Step #24, when all the document reading in the job are finished, the read control unit 30 controls the second memory 36 to reset the history information (Step #25 to END). In this way, the history information becomes correct information indicating whether or not the document feeder unit 2 is opened and closed for resetting the document.

Next, another embodiment is described. In the embodiment described above, there is described the case where the read control unit 30 determines the document reading place (the determining unit is the read control unit 30). However, the document transport control unit 20 or the main control unit 6 may perform the determination. When the document transport control unit 20 performs the determination, the document transport control unit 20 receives the open and close history and the information indicating presence or absence of a document on the place-reading contact glass 32 from the read control unit 30, so as to perform the determination. When the main control unit 6 performs the determination, the main control unit 6 receives the open and close history and the information indicating presence or absence of a document on the place-reading contact glass 32 from the read control unit 30, and receives a result of the detecting setting of the document based on the output of the document set sensor S1 and information indicating whether or not an object is placed on the document tray 21 based on the size detection unit 29 from the document transport control unit 20, so as to perform the determination.

Although embodiments of the present disclosure are described above, the scope of the present disclosure is not limited to the embodiments, and it is possible to add various modifications within the scope without deviating from the spirit of the disclosure.

What is claimed is:

1. A reading device comprising:
an image reading unit including a place-reading contact glass on which a document to be read is placed and a feed-reading contact glass on which a transported document sheet passes, so as to perform document reading by one of place reading for reading the document placed on the place-reading contact glass and feed reading for reading the transported document sheet;
a document feeder unit being capable of opening and closing with respect to the image reading unit, and configured to feed a document sheet set on a document tray and to transport the document sheet to the feed-reading contact glass;
a table document detection unit for detecting whether or not there is a document on the place-reading contact glass;
a document set sensor for detecting whether or not a document sheet is set on the document tray in such a manner that the document feeder unit is capable of feeding the document sheet;
a size detection unit including a size sensor disposed at the document feeder unit for detecting a size in a document transport direction of the document sheet set on the document tray, the size sensor being a sensor provided in addition to the document set sensor;
an open/close detection unit for detecting open and close of the document feeder unit;

an input unit for accepting an instruction to start the document reading;
a notifying unit configured to display a screen for request, confirmation, or selection;
a history storing unit for storing history information about whether or not the document feeder unit is opened and closed in a period after a last document reading job is finished until the instruction to start the document reading is issued based on an output of the open/close detection unit; and
a determining unit for detecting whether or not there is a document on the place-reading contact glass based on an output of the table document detection unit, whether or not a document sheet is set on the document tray based on an output of the document set sensor, and a size of an object placed on the document tray based on an output of the size detection unit, for determining whether to execute the feed reading, or to execute the place reading, or to be disabled to determine to execute the place reading or the feed reading, based on whether or not there is a document on the place-reading contact glass and based on the history information, in a determination necessary state in which the document set sensor does not detect that a document sheet is set on the document tray while the size detection unit detects an object on the document tray, and for permitting the feed reading or the place reading to be started not promptly but after making the notifying unit display the screen for request, confirmation, or selection, even when an instruction to execute a job accompanying the document reading is issued in the determination necessary state.

2. The reading device according to claim 1, wherein in case of the determination necessary state, the determining unit determines to read the document by the feed reading when it is detected that there is no document on the place-reading contact glass with the history information indicating that the document feeder unit is opened and closed, and when it is detected that there is no document on the place-reading contact glass with the history information indicating that the document feeder unit is not opened and closed.

3. The reading device according to claim 2, wherein
when the determining unit determines to read the document by the feed reading, the notifying unit requests to reset the document on the document tray,
when the determining unit detects that the document is set on the document tray based on the output of the document set sensor after the reset request, the document feeder unit starts to feed and transport the document sheet automatically or after the input unit accepts the instruction to start the document reading, and
the image reading unit reads the document sheet passing the feed-reading contact glass so as to generate the image data.

4. The reading device according to claim 1, wherein in case of the determination necessary state, the determining unit determines to execute the place reading when it is detected that there is a document on the place-reading contact glass with the history information indicating that the document feeder unit is opened and closed.

5. The reading device according to claim 4, wherein when the determining unit determines to execute the place reading, the image reading unit reads the document placed on the place-reading contact glass so as to generate the image data automatically or when an instruction to read the document placed on the place-reading contact glass is input to the input unit.

6. The reading device according to claim 1, wherein in case of the determination necessary state, the determining unit determines that it is disabled to confirm to execute the place reading or to execute the feed reading in the state where it is detected that there is the document on the place-reading contact glass with the history information indicating that the document feeder unit is not opened and closed.

7. The reading device according to claim 6, wherein
when the determining unit determines that it is disabled to confirm, the notifying unit requests to select one of execution of the place reading and execution of the feed reading,
when the input unit accepts a selection to execute the feed reading based on the selection request, after the determining unit detects that the document is set on the document tray based on the output of the document set sensor, the document feeder unit starts to feed and transport the document sheet automatically or after the input unit accepts the instruction to start the document reading, and the image reading unit reads the document passing the feed-reading contact glass so as to generate the image data, and
when the input unit accepts a selection to execute the place reading based on the selection request, the image reading unit reads the document placed on the place-reading contact glass so as to generate the image data.

8. The reading device according to claim 1, wherein the history storing unit resets the history information when the document reading job is finished.

9. The reading device according to claim 1, wherein
the determining unit determines to execute the feed reading in the state where the document set sensor detects setting of the document when a job accompanying the document reading is being started, and
the determining unit determines to execute the place reading in the state where the document set sensor does not detect the setting of the document while the size detection unit does not detect an object on the document tray when the job accompanying the document reading is being started.

10. An image forming apparatus comprising the reading device according to claim 1.

11. A control method for a reading device, comprising the steps of:
reading a document by one of place reading for reading a document placed on a place-reading contact glass and feed reading for reading a document sheet transported to pass a feed-reading contact glass;
feeding and transporting the document sheet set on a document tray of a document feeder unit to the feed-reading contact glass when executing the feed reading;
detecting whether or not there is a document on the place-reading contact glass;
detecting whether or not the document sheet is set on the document tray in such a manner that the document feeder unit is capable of feeding the document sheet;
detecting a size of the document sheet set on the document tray by using a size sensor disposed at the document feeder unit for detecting a size in a document transport direction of the document sheet set on the document tray, the size sensor being a sensor provided in addition to a document set sensor for detecting whether or not the document sheet is set on the document tray in such a manner that the document feeder unit is capable of feeding the document sheet;
detecting open and close of the document feeder unit;
accepting an instruction to start document reading;

storing history information indicating whether or not the document feeder unit is opened and closed in a period from an end of a last document reading job until an instruction to start the document reading is issued;

determining to execute the feed reading, or to execute the place reading, or to be disabled to determine to execute the place reading or the feed reading, based on whether or not there is a document on the place-reading contact glass and based on the history information, in a determination necessary state in which it is not detected that a document is set on the document tray while an object on the document tray is detected; and permitting the feed reading or the place reading to be started not promptly but after making a notifying unit display a screen for request, confirmation, or selection, even when an instruction to execute a job accompanying the document reading is issued.

* * * * *